US011802419B2

(12) United States Patent
Hamblen et al.

(10) Patent No.: US 11,802,419 B2
(45) Date of Patent: Oct. 31, 2023

(54) PROCESSING AND TRACKING OF BIOLOGICAL MATERIALS IN CEMENT KILNS

(71) Applicant: Minerals & Fuels, Inc., Glendora, CA (US)

(72) Inventors: G. Allen Hamblen, Glendora, CA (US); Steven A. Regis, Glendora, CA (US)

(*) Notice: Subject to any disclaimer, the term of this patent is extended or adjusted under 35 U.S.C. 154(b) by 54 days.

(21) Appl. No.: 17/316,466

(22) Filed: May 10, 2021

(65) Prior Publication Data

US 2021/0348416 A1 Nov. 11, 2021

Related U.S. Application Data

(60) Provisional application No. 63/023,095, filed on May 11, 2020.

(51) Int. Cl.
| | | |
|---|---|---|
| *E04H 13/00* | (2006.01) | |
| *C04B 7/44* | (2006.01) | |
| *C04B 7/52* | (2006.01) | |
| *A61G 17/08* | (2006.01) | |

(52) U.S. Cl.
CPC ........... *E04H 13/008* (2013.01); *A61G 17/08* (2013.01); *C04B 7/44* (2013.01); *C04B 7/52* (2013.01)

(58) Field of Classification Search
CPC ........ A61G 17/00; A61G 17/08; E04H 13/08; C04B 7/44; C04B 7/52; C04B 7/24; C04B 18/06; Y02P 40/10; Y02W 30/91
USPC .............................................................. 27/1
See application file for complete search history.

(56) References Cited

U.S. PATENT DOCUMENTS

| | | | |
|---|---|---|---|
| 1,640,680 A | 8/1927 | Vanderlaan | |
| 5,016,330 A | 5/1991 | Botsch | |
| 6,189,188 B1 | 2/2001 | O'Hare | |
| 6,382,111 B1* | 5/2002 | Hojaji | B09B 3/29 110/341 |
| 6,615,463 B1 | 9/2003 | Hojaji | |
| 6,948,271 B2* | 9/2005 | Helgeson | G09F 3/005 40/633 |
| 7,318,261 B2* | 1/2008 | Bills | G09F 3/00 63/3 |
| 7,877,847 B2* | 2/2011 | Bills | G09F 3/00 110/194 |

(Continued)

FOREIGN PATENT DOCUMENTS

| | | |
|---|---|---|
| AU | 2012100402 A4 | 5/2012 |
| GB | 2479909 A | 11/2011 |

(Continued)

OTHER PUBLICATIONS

Mørch, "Labelling of particulate matter for tracer studies in incinerators, sedimentation tanks and mixers," International Journal of Applied Radiation and Isotopes 28:889-894, 1977.

*Primary Examiner* — William L Miller
(74) *Attorney, Agent, or Firm* — Seed IP Law Group LLP

(57) ABSTRACT

Methods of processing biological materials such as the remains of humans or pets, which may be enclosed in a casket, include depositing the biological materials, including the remains and/or the casket, into a cement kiln and operating the cement kiln to produce clinker, thereby incorporating products of the biological remains into the clinker, such as into a crystal or molecular structure of the clinker, and then grinding the clinker to form a cementitious product.

21 Claims, 1 Drawing Sheet

(56) References Cited

U.S. PATENT DOCUMENTS

| | | | |
|---|---|---|---|
| 9,745,223 B2 | 8/2017 | Hojaji | |
| D921,325 S * | 6/2021 | Crowe | D99/5 |
| 11,051,591 B2 * | 7/2021 | Jackson | A44C 25/002 |
| 2006/0137154 A1 * | 6/2006 | Bills | G09F 3/00 27/1 |
| 2009/0007401 A1 * | 1/2009 | Bills | G09F 3/00 27/1 |
| 2009/0077779 A1 | 3/2009 | Zimmerman et al. | |
| 2009/0266108 A1 * | 10/2009 | Balme | A44C 17/006 27/1 |
| 2014/0013554 A1 * | 1/2014 | Hojaji | C08K 11/00 27/1 |
| 2014/0116296 A1 | 5/2014 | Williams | |
| 2015/0126362 A1 | 5/2015 | Despen et al. | |

FOREIGN PATENT DOCUMENTS

| | | |
|---|---|---|
| JP | 2004-299955 A | 10/2004 |
| WO | 01/59366 A1 | 8/2001 |

* cited by examiner

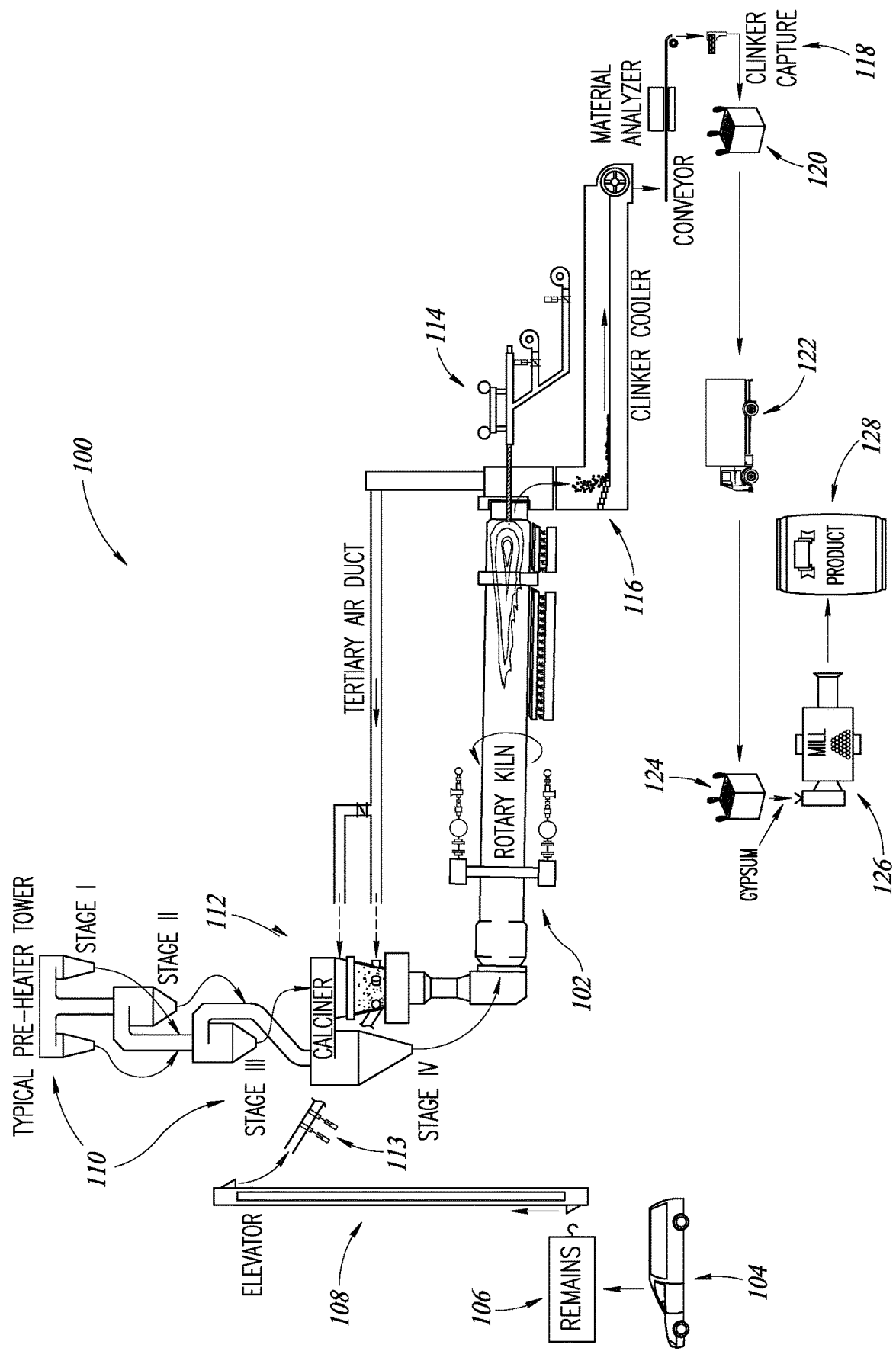

PROCESSING AND TRACKING OF BIOLOGICAL MATERIALS IN CEMENT KILNS

BACKGROUND

Technical Field

The present disclosure relates to methods of, and systems for, processing and/or tracking of biological materials, such as human or animal remains, in cement kilns, such as to obtain clinker incorporating products of the biological materials.

Description of the Related Art

Cement kilns are often used in the production of cement for use in concrete throughout the world. Some cement kilns are rotary kilns, which include long, hollow tubes that are often made from an outer metal (e.g., steel) shell and an inner refractory lining, such as a 12" thick layer of firebrick, which can insulate the metal shell and protect the metal shell from the material being processed. Such tubes can be several meters in diameter and several tens or even hundreds of meters in length. The tubes are typically oriented at between about 1° and about 4° from horizontal so that materials in the tube tend to travel through the tube toward the lower end. During operation, the tubes typically rotate about their central longitudinal axes at a rate of, as an example, one revolution per hour. Such rotation helps to ensure that the materials in the tube are mixed and travel along the length of the tube.

A raw material to be processed can be fed into the upper end of the tube or into a top end of an associated heat exchange tower, while a source of heat, such as a source of a flame, can be positioned at the lower end of the tube. The heat source can generate enough heat to raise the temperature inside the kiln to over 1000° C. The raw material heats up and is thereby processed as it progresses and moves along the length of the tube, toward the bottom end of the tube, and toward the heat source. The raw material can be continuously fed into the upper end of the tube, and the processed material can be continuously removed from the bottom end of the tube, so that the rotary kiln can operate continuously, without needing to shut down between batches. Such continuous operation is important to maintaining the efficiency of the kiln, because cooling and reheating the kiln from and to operating temperatures is both time consuming and expensive.

BRIEF SUMMARY

A method may be summarized as comprising: depositing biological remains into a cement kiln; operating the cement kiln to produce clinker, thereby incorporating products of the biological remains into the clinker; and tracking the location of the products of the biological remains as the products of the biological remains move through the cement kiln.

The method may further comprise: extracting the clinker from the cement kiln; grinding the clinker, thereby forming cement incorporating the products of the biological remains; mixing the cement with aggregate and water; and allowing the mixture to set, thereby forming concrete. Forming concrete may include forming a portion of a memorial. Forming concrete may include forming a portion of a sculpture. Forming concrete may include forming a concrete structure in accordance with instructions provided, prior to death, by the deceased from whose body the biological remains were derived. The biological remains may include human remains. The biological remains may include remains of a pet animal. Incorporating products of the biological remains into the clinker may include incorporating the products of the biological remains into a crystal structure of the clinker. Incorporating products of the biological remains into the clinker may include incorporating the products of the biological remains into a molecular structure of the clinker.

The method may further comprise depositing limestone, ferrous oxides, and aluminosilicate into the cement kiln. The cement kiln may be a rotary cement kiln including an elongate hollow tube and depositing the biological remains into the cement kiln may include depositing the biological remains into the tube. The tube may be at least 1 meter in diameter and at least 10 meters in length. The tube may have a central longitudinal axis oriented at an angle greater than 1° from horizontal, wherein the tube rotates about the central longitudinal axis at a rate of at least 0.1 revolutions per hour, and wherein operating the cement kiln to produce clinker includes moving the biological remains along a length of the tube aligned with the central longitudinal axis. The clinker may include conglomerations of cementitious materials, the conglomerations having diameters greater than 1 mm.

Depositing biological remains into a cement kiln may include depositing biological remains and a casket enclosing the biological remains into the cement kiln. Depositing biological remains into a cement kiln may include depositing biological remains together with a tracer material for the biological remains into the cement kiln. The method may further comprise capturing and moving clinker incorporating the products of the biological remains from a pan or belt or apron conveyor into a receptacle for the clinker. Capturing and moving the clinker may include using a cross-belt automated sampler on a belt conveyor. Capturing and moving the clinker may include using a rotary cross-stream sampler to capture and move at least 1 pound of clinker from the pan or belt or apron conveyor.

A product may be summarized as comprising: a package; and a ground cement clinker contained within the package, wherein the cement clinker includes products of human remains. The product may be produced by a process comprising: depositing the human remains into a cement kiln; operating the cement kiln to produce the clinker, thereby incorporating the products of the human remains into the clinker; and grinding the clinker. Incorporating the products of the human remains into the clinker may include incorporating the products of the human remains into a crystal structure of the clinker. Incorporating the products of the human remains into the clinker may include incorporating the products of the human remains into a molecular structure of the clinker.

BRIEF DESCRIPTION OF THE SEVERAL VIEWS OF THE DRAWINGS

The FIGURE illustrates a schematic diagram of a system for and a method of processing biological materials, such as human or animal remains, in a cement kiln.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Various examples of suitable dimensions of components and other numerical values may be provided herein. Such dimensions and other numerical values may be accurate to within standard manufacturing tolerances unless stated otherwise. Such dimensions and any other specific numerical values provided herein may also be approximations wherein the actual numerical values vary by up to 1, 2, 5, 10, 15, or more percent from the stated, approximate dimensions or other numerical values.

The FIGURE illustrates a system 100, including a rotary cement kiln 102, for producing cement or cementitious material, with Portland cement being one notable example, such as for use in the manufacture of concrete. Concrete is generally formed by mixing cement, aggregate (e.g., fine aggregates such as sand and course aggregates such as gravel), and water in specific proportions, then pouring the mixture into formwork in a flowable state so that the mixture fills the formwork and hardens into solid concrete having a shape defined by the interior surfaces of the formwork. The proportions of the cement, aggregate, water, and any supplementary materials in the original mixture influence many important properties of the hardened concrete, including its overall strength. Once cement, aggregate, and water are mixed, a chemical reaction begins to take place between the cement and the water that forms materials that adhere to the aggregate and bind it together into a solid, unitary form as the mixture hardens into solid concrete.

Cements such as Portland cement are often manufactured by heating, burning, and/or incinerating mixtures including limestone and aluminosilicate (e.g., clay) materials at high temperatures, such as over 1,000° C., 1,100° C., 1,200° C., 1,300° C., 1,400° C., or 1,500° C., such as in a rotary cement kiln such as rotary cement kiln 102. As such mixtures are processed under such conditions, the materials undergo calcination and, subsequently, other chemical reactions to form cement materials, including calcium silicates, and are sintered or otherwise fused to form large solid lumps or conglomerations of the cementitious materials. Such conglomerations may have diameters greater than 1 mm, 2 mm, 3 mm, 5 mm, 10 mm, 15 mm, 20 mm, or 25 mm when they are removed from the cement kiln, and are typically referred to as "clinker." In some implementations, 15 mm may be a particularly desirable diameter for the clinker, and clinker having a diameter substantially larger than 15 mm (e.g., at least 40 mm) may be crushed or ground such that it has diameters closer to 15 mm (e.g., under 40 mm). The clinker is then ground together with other materials, such as gypsum and/or limestone, to form the final cementitious product, such as Portland cement.

The present disclosure relates generally to the incorporation and use of human or other animal remains in the production of cementitious materials such as Portland cement. As used herein, the terminology "biological materials" is used in a broad sense to refer to any biological or organic matter, such as that of or that produced by a living organism. The terminology "remains" is used to refer to the once-living tissues or other materials of a human's, pet's, animal's or other living entity's body. Biological materials include remains, as that terminology is used herein.

FIG. 1 illustrates that the system 100 includes a first vehicle 104, which may be a standard passenger vehicle, a delivery truck, a hearse, or other vehicle capable of delivering biological materials such as human or other animal remains, and a first input receptacle 106, such as a casket or other box, which can store and carry the biological materials such as human or other animal remains. In some cases, the first vehicle 104 may deliver the biological materials in the first input receptacle 106, which may be a fully combustible green casket, which may be made of recycled cardboard or other natural materials such as bamboo, wicker, cotton, wool, or wood. The system 100 also includes an elevator 108 that receives the biological materials and/or the first input receptacle 106, and moves the biological materials and/or the first input receptacle 106 upwards toward the top of the system 100, such as by about 25 feet.

The first input receptacle 106 may be a casket having a plurality of sturdy handles to assist in carrying the casket and in placing the casket on and engaging the casket with the elevator 108. The elevator 108 includes a slow-moving horizontal feed belt, onto which the casket can be initially placed, and a traditional, vertical tire elevator belt that can receive the biological materials and/or the first input receptacle 106 from the feed belt and carry the biological materials and/or the first input receptacle 106 upwards. Thus, the feed belt may be referred to as a magazine for temporary storage of the biological materials and/or first input receptacle 106 and for feeding the biological materials and/or the first input receptacle 106 to the tire elevator belt when it is ready to accept them. The feed belt and/or the elevator belt may be enclosed within a gallery.

The system 100 also includes a set of cyclones 110 that provide heat exchange to feed materials including ground limestone, iron oxides, and aluminosilicate (e.g., clay), to be supplied to the cement kiln 102. In some embodiments, there may be one to five additional stages of cyclones 110 above the bottom cyclone(s) 110. The biological materials from the elevator 108 may be introduced into a calciner 112 through an enclosed chute 113. In some implementations, the biological materials may be introduced through the chute 113 and/or a riser duct just below a vessel of the calciner 112. In some implementations, an automatic crane can be used to move and deposit the biological materials and/or the first input receptacle 106 into the enclosed chute 113, such as by grabbing the first input receptacle 106 by a plurality of lifting lugs built into the first input receptacle 106.

The system 100 also includes a precalciner 112, which may also be referred to as the calciner 112, which is configured to receive materials from the cyclones 110, and specifically to receive the biological materials and/or first input receptacle 106 from one of the cyclones 110 through the enclosed chute 113, which may also be referred to herein as a riser duct 113, and which may be oriented at an angle between 55 and 85 degrees, such as a 70 degree angle, above horizontal, and include a triple-gate air lock. The calciner 112 is also configured to burn fuel to heat and calcinate the feed materials provided thereto before they are fed into or provided to the rotary cement kiln 102. In some implementations, the calciner 112 may heat the materials provided thereto to over 800 or 850° C., or to nearly 900° C.

The rotary cement kiln 102 is configured to receive materials from the calciner 112 and to further process the materials to produce clinker. For example, the rotary cement kiln 102 includes a long, hollow tube made from an outer metal (e.g., steel) shell and an inner refractory lining, such as a 12" thick layer of firebrick. The tube is at least 1, at least 2, at least 3, at least 4, or at least 5 meters in diameter and at least 10, at least 20, at least 30, at least 40, at least 50, at least 60, at least 70, at least 80, at least 90, at least 100, at least 120, at least 150, or at least 200 meters long. The tube has a central longitudinal axis that is oriented at greater than 1°, 2°, 3°, 4°, 5°, 6°, 7°, or 8°, and less than 2°, 3°, 4°, 5°, 6°, 7°, 8°, or 9° from horizontal so that materials in the tube tend to travel through the tube toward its lower end. During operation of the system 100, the tube rotates about its central longitudinal axis at a rate of at least 0.1, 0.2, 0.5, 1.0, 1.5, 2.0, or 3.0, and no more than 0.2, 0.5, 1.0, 1.5, 2.0, 3.0, or 4.0 revolutions per hour.

The rotary cement kiln 102 is configured to receive at least partially calcined materials (e.g., at 85-95% calcination) at its top or upper end from the calciner 112, and is configured to receive a heat source 114, such as a source of a flame or a burner, at its bottom or lower end. The heat source 114 can have a flame temperature of at least 1900 or 2000° C., and can generate enough heat to raise the temperature inside the kiln 102 to over 1000° C., 1,100° C., 1,200° C., 1,300° C., 1,400° C., 1475° C., or 1,500° C. The partially calcined materials continue to heat up and are further processed as they progress along the length of the tube, toward the bottom end of the tube, and toward the heat source 114. In some cases, the calciner 112 pre-heats and/or partially calcinates the materials before they are fed into the rotary cement kiln 102, the materials are supplied from the calciner 112 to the rotary cement kiln 102, and the materials are further calcined, sintered, and thereby converted to clinker within the cement kiln 102. In other cases, the calciner 112 heats and almost completely calcinates the materials before they are fed into the rotary cement kiln 102, the materials are supplied from the calciner 112 to the rotary cement kiln 102, and the materials are then sintered and thereby converted to clinker within the rotary cement kiln 102. In either case, the lime and silicate materials combine to form tricalcium and dicalcium silicates, which are known as alite and belite, respectively. Any and all ash of the biological and other fuel materials is incorporated into the clinker itself, such as into a crystal or molecular structure thereof, and such that no ash remains separate from the clinker at the end of the process.

The system 100 also includes a clinker cooler 116, which may be a reciprocal grate or walking floor type cooler, configured to receive clinker from the rotary cement kiln 102 and to cool the clinker. Once the materials have been converted to clinker within the rotary cement kiln 102, the clinker falls out of the bottom end of its tube and into the clinker cooler 116, within which the clinker is cooled, such as by air cooling or any other clinker cooling techniques known in the art. In some implementations, ambient air is blown through the clinker to cool the clinker and the resulting heated air is used in the combustion described herein. Some additional ambient air may be used to further cool the clinker to a temperature suitable for handling by human operators, with the resulting heated air vented to atmosphere through a filter, such as one commercially available under the brand name baghouse. The system 100 also includes a clinker capture device 118, which may include an output receptacle 120, such as a box, which is configured to receive cooled clinker from the clinker cooler 116 and store the cooled clinker for later use. In some implementations, clinker is generally directed from the clinker cooler 116 to ordinary, standard milling operations, while clinker that includes products of biological remains is captured by the clinker capture device 118 and directed to the output receptacle 120.

The system 100 also includes a second vehicle 122, which may be a truck, configured to receive or pick up the cooled clinker from the output receptacle 120 and carry or deliver the cooled clinker to a second input receptacle 124 of a cement mill 126. In some cases, the cement mill 126 may be a dedicated ball mill, that is, a ball mill that is dedicated to using, milling, grinding, and/or processing only clinker products that have incorporated biological materials as described herein. The cement mill 126 combines the cooled clinker from the second input receptacle 124 with gypsum and/or limestone and mixes and grinds them into a powder to form a final cement product 128, such as for use in the manufacture of concrete.

A method of using the system 100 to produce cement or cementitious material, such as Portland cement, such as for use in the manufacture of concrete, includes obtaining biological materials, such as the remains of a human, a pet, or another animal. The method may also include providing such biological materials, such as by a mortuary, morgue, coroner, veterinarian, hospital, or other source, to the vehicle 104. The method may also include using the vehicle 104 to deliver the biological materials from the source to the elevator 108, such as within the first input receptacle 106. The method may also include using the elevator 108 to carry the biological materials and/or the first input receptacle 106 upward from the vehicle 104 to the top or upper end of the system 100, and then depositing the biological materials and/or the first input receptacle 106 from the top of the elevator 108 into the enclosed chute 113. The method may also include temporarily storing the biological materials and/or the first input receptacle 106 and then depositing the biological materials and/or the first input receptacle 106 into the calciner 112 through the enclosed chute 113. The other feed materials may be fed into the calciner 112 from the cyclones 110.

Once the biological and other materials enter the calciner 112, the method may also include heating, burning, incinerating, and/or at least partially calcinating the materials within the calciner 112. The method may also include feeding such processed or pre-processed materials from the calciner 112 into the top end of the rotary cement kiln 102, igniting and operating the burner 114 at the bottom of the rotary cement kiln 102, and rotating the tube of the rotary cement kiln 102 about its central longitudinal axis to heat, calcinate, and/or sinter and thereby process the materials into a clinker, where the ash of the remains or other biological materials is incorporated into the clinker. The method may include combusting all biological or organic materials within the calciner 112 and/or the rotary cement kiln 102, and exhausting any product water vapor or other waste or exhaust products through a filter, such as those commercially available under the brand name baghouse, and then a stack, which exhaust may be driven by a fan. The method may also include depositing the clinker material from the bottom end of the rotary cement kiln 102 into the clinker cooler 116, and cooling the clinker therein. The method may also include capturing the cooled clinker from a terminal end of the clinker cooler 116, such as with the clinker capture device 118, and then depositing the cooled clinker material into an output receptacle 120.

The method may also include using the vehicle 122 to deliver the cooled clinker materials from the output receptacle 120 to the second input receptacle 124 of the cement mill 126, which may be located either on-site or off-site with respect to the kiln 102. The method may also include, by operating the cement mill 126, combining and mixing the cooled clinker from the second input receptacle 124 with other materials such as gypsum and/or limestone, and grinding the mixture into a powder, thereby forming the final cement product 128. The method may also include selling the final cement product 128, such as to an end consumer, such as to a relative or loved one of the deceased from whose body the biological materials were derived. The method may also include selling the final cement product 128, such as to a commercial or industrial consumer of cement products that is interested in using cementitious materials incorporating the ash of biological materials. In some cases, the method may include selling the final cement product 128 to a commercial or industrial consumer of cement products as directed, prior to death, by the deceased from whose body the biological materials were derived. Thus, a person may designate that their remains are to be incorporated into a cement product and used to manufacture the concrete of a specific structure such as a memorial, a sculpture, a bridge, a roadway, a railway, a dam, a canal, a sewer, a pipeline, a tower, or another structure. In such uses, the method may also include mixing the final cement product 128 with traditional cement for use in ready-mix or any other concrete products.

As described herein, a rotary cement kiln typically operates continuously, with raw material continuously fed into the upper end of its tube and the processed material continuously removed from the bottom end of the tube. Such continuous operation can be important to maintaining the efficiency of the kiln, because cooling and reheating the kiln from and to operating temperatures is both time consuming and expensive. Thus, a rotary cement kiln may be operated continuously even though biological materials such as human, pet, or other animal remains are not continuously supplied thereto. As a result, it is valuable to be able to track the location of the biological materials, or other materials formed therefrom as they are processed in the system 100, as they travel through the system 100.

Thus, in some embodiments, a bag of titanium oxide ($TiO_2$) powder, or a titanium oxide slug, may be added to the first input receptacle 106 (e.g., the casket), to provide a tracer material. As it travels through the system 100 and is processed according to the methods described herein, the titanium oxide is incorporated into the clinker. The presence of the titanium oxide in the clinker can be detected in a relatively straightforward manner, such as through the use of X-ray fluorescence (XRF) analysis, or prompt gamma neutron activation analysis (PGNAA), in order to determine which portions of the clinker have incorporated the biological materials or human, pet, or other animal remains. Both XRF analysis and PGNAA can detect Ti at 0.01%. Typical cement clinker without added tracer material contains about 0.25% $TiO_2$ from the feed materials. By adding 25 pounds of $TiO_2$ powder to the input receptacle 106, the portions of the clinker having incorporated the biological materials or human, pet, or other animal remains can be readily distinguished from other portions of the clinker. Once the clinker has been stored in the output receptacle 120, it can be flagged by instrumentation for pickup and transport to the cement mill 126 by the second vehicle 122.

The system 100 may also include a computer control system configured to control and direct operation of the other components of the system 100. The computer control system may be further configured to track the location of the remnants or products of the biological materials as they travel through the system 100, especially through the rotary cement kiln 102 and the clinker cooler 116, such that the clinker incorporating the remnants or products of such materials can be located as it exits the clinker cooler 116. As described herein, the calciner 112 is configured to receive biological materials and/or the first input receptacle 106 from one of the cyclones 110 through a riser duct 113 including a triple-gate air lock. In some implementations, each gate of the triple-gate air lock has an open/closed limit switch that is electrically and communicatively coupled to the computer control system. As the biological materials, the first input receptacle 106, and/or the $TiO_2$ tracer travel or pass (e.g., fall) through the gates (e.g., the last or lowest of the gates) of the triple-gate air lock, the computer control system records a timestamp indicating the time the biological materials fell into the calciner 112, through the calciner 112, and into the rotary cement kiln 102.

The computer control system may further track the location of the biological materials or the remnants or products thereof as they travel through and along the length of the rotary cement kiln 102 from the top end to the bottom end thereof. In some cases, the computer control system can calculate or estimate the amount of time it takes the biological materials, or the remnants or products thereof, to travel through the rotary cement kiln 102 in accordance with the following equation: residence time=(1.77*kiln length in meters*the square root of the angle of repose of the material in the kiln)/(the kiln slope in degrees*internal kiln diameter in meters*the kiln's rotational speed in rotations per minute). The location of the materials within the kiln at any moment during the residence time can then be calculated or estimated by assuming that their speed of travel along the length of the kiln, that is, with respect to the kiln, is constant.

The computer control system may further track the location of the biological materials or the remnants or products thereof as they travel through and along the length of the clinker cooler 116. In some cases, the computer control system can calculate or estimate the amount of time it takes the clinker incorporating the biological materials, or the remnants or products thereof, to travel through the clinker cooler, such as a reciprocal grate cooler, in accordance with the following equation: residence time=(100*the cooler length in meters)/(grate speed*grate stroke length*60*n), where n represents a measure of grate transport efficiency measured as a percentage, and can be calculated in accordance with the following equation: n=(100*kiln clinker output in metric tons per day*60*clinker density in metric tons per cubic meter)/(24*grate width in meters*stroke length in meters*bed height in meters*grate speed in strokes per minute). The location of the materials within the clinker cooler at any moment during the residence time can then be calculated or estimated by assuming that their speed of travel along the length of the clinker cooler, that is, with respect to the clinker cooler and/or cooler grates thereof, is constant.

In some embodiments, cooled clinker can exit the clinker cooler 116 onto a pan or apron or belt conveyor. In response to signals from the computer control system indicating that the cooled clinker exiting the clinker cooler 116 incorporates the biological materials, or the remnants or products thereof, based on calculations and/or detection of $TiO_2$ doping as described herein, the clinker capture system 118 can capture and move clinker incorporating the biological materials, or the remnants or products thereof, from the pan or apron or belt conveyor into the output receptacle 120. In some cases, the clinker capture system 118 uses either a cross-belt automated sampler on a belt conveyor or a rotary cross-stream sampler to capture at least 1, 2, 3, 4, 5, 10, 15, 20, 25, 30, 40, 50, 75, or 100, or up to 10, 15, 20, 25, 30, 40, 50, 75, 100, or 125 pounds of the cooled clinker incorporating the biological materials or the remnants or products thereof, such as from a discharge end of the pan or apron conveyor.

It has been found that the systems and methods described herein can provide significant energy savings and can significantly reduce greenhouse gas emissions associated with traditional methods of cremating human, pet, or other animal remains. For example, assuming a 170 pound human body is to be disposed of, and using 205 pounds of $CO_2$ emitted per million British thermal units (Btu) energy for bituminous coal use (as provided by https://www.eia.gov/tools/faqs/faq.php?id=73&t=11), it has been calculated that disposing of the body as described herein rather than by traditional cremation may result in a savings of about 3,600 pounds of $CO_2$ emissions, such as by reducing the amount of fuel used and/or recovering the fuel value of the biological or organic material in the body or remains.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method, comprising:
    depositing biological remains together with a tracer material for the biological remains into a cement kiln;
    operating the cement kiln to produce clinker, thereby incorporating products of the biological remains into the clinker; and
    tracking the location of the products of the biological remains, using a computer control system, as the products of the biological remains move through the cement kiln.

2. The method of claim 1, further comprising:
    extracting the clinker from the cement kiln;
    grinding the clinker, thereby forming cement incorporating the products of the biological remains;
    mixing the cement with aggregate and water; and
    allowing the mixture to set, thereby forming concrete.

3. The method of claim 2 wherein forming concrete includes forming a portion of a memorial.

4. The method of claim 2 wherein forming concrete includes forming a portion of a sculpture.

5. The method of claim 2 wherein forming concrete includes forming a concrete structure in accordance with instructions provided, prior to death, by the deceased from whose body the biological remains were derived.

6. The method of claim 1 wherein the biological remains include human remains.

7. The method of claim 1 wherein the biological remains include remains of a pet animal.

8. The method of claim 1 wherein incorporating products of the biological remains into the clinker includes incorporating the products of the biological remains into a crystal structure of the clinker.

9. The method of claim 1 wherein incorporating products of the biological remains into the clinker includes incorporating the products of the biological remains into a molecular structure of the clinker.

10. The method of claim 1, further comprising depositing limestone, ferrous oxides, and aluminosilicate into the cement kiln.

11. The method of claim 1 wherein the cement kiln is a rotary cement kiln including an elongate hollow tube and depositing the biological remains into the cement kiln includes depositing the biological remains into the tube.

12. The method of claim 11 wherein the tube is at least 1 meter in diameter and at least 10 meters in length.

13. The method of claim 11 wherein the tube has a central longitudinal axis oriented at an angle greater than 1° from horizontal, wherein the tube rotates about the central longitudinal axis at a rate of at least 0.1 revolutions per hour, and wherein operating the cement kiln to produce clinker includes moving the biological remains along a length of the tube aligned with the central longitudinal axis.

14. The method of claim 1, wherein the clinker includes conglomerations of cementitious materials, the conglomerations having diameters greater than 1 mm.

15. The method of claim 1, wherein depositing biological remains into the cement kiln includes depositing biological remains and a casket enclosing the biological remains into the cement kiln.

16. The method of claim 1, further comprising capturing and moving clinker incorporating the products of the biological remains from a pan or belt or apron conveyor into a receptacle for the clinker.

17. The method of claim 16 wherein capturing and moving the clinker includes using a cross-belt automated sampler on a belt conveyor.

18. The method of claim 16 wherein capturing and moving the clinker includes using a rotary cross-stream sampler to capture and move at least 1 pound of clinker from the pan or belt or apron conveyor.

19. A process of producing a product, the product including a package and a ground cement clinker contained within the package, wherein the cement clinker includes products of human remains, the process comprising:
    depositing the human remains into a cement kiln;
    operating the cement kiln to produce the clinker, thereby incorporating the products of the human remains into the clinker; and
    grinding the clinker.

20. The process of claim 19 wherein incorporating the products of the human remains into the clinker includes incorporating the products of the human remains into a crystal structure of the clinker.

21. The process of claim 19 wherein incorporating the products of the human remains into the clinker includes incorporating the products of the human remains into a molecular structure of the clinker.

* * * * *